UNITED STATES PATENT OFFICE.

ALBERT H. HENDERSON, OF BALTIMORE, MARYLAND.

MANUFACTURE OF STEEL.

1,361,383.         Specification of Letters Patent.    Patented Dec. 7, 1920.

No Drawing.        Application filed October 2, 1918. Serial No. 256,591.

*To all whom it may concern:*

Be it known that I, ALBERT H. HENDERSON, a citizen of the United States, residing at Baltimore, State of Maryland, have invented new and useful Improvements in the Manufacture of Steel, of which the following is a specification.

This invention more especially relates to a process of refining and cleansing open hearth steel, but is applicable to other treatments having as their object the purifying of that metal while in molten state for use in various arts. This process in no wise interferes with any regular and approved formulæ employed in the manufacture of steel, and may be used in connection with various known modes of making steel from pig and other metal, as in the basic open hearth, or acid or Bessemer processes. My preference, however, is for the basic open hearth furnace.

The main or characteristic features of my invention relate to the production in a furnace of a molten metal cleansed and purified from deleterious matter, such as phosphorus, sulfur, etc., the gases from such substances escaping through the stack; and a subsequent treatment of a selected body of such cleansed and purified metal, as in a ladle whereby are effected certain elemental changes therein adapting the metal for the molding of ingots or other castings free from deep piping, blow-holes, seams, or the like, and having great tenacity, bending qualities, and ultimate strength, fitting it for forging, rolling, machining, etc. It may be mentioned that the steel produced under my invention is well qualified for resistance to severe strains and shocks, as the impact of projectiles.

My invention may be considered as comprising two steps, the one relating to the furnace or converter and the other to the ladle to which the molten metal is poured from the furnace, but is more fully set forth in the description and the claims.

The following is explanatory of acts which have been performed in practice, and which serve to illustrate generally my invention.

Referring first to the treatment of the charge in the furnace, after the metal has been heated to about a semi-cherry red, by which term is meant a bright glow, I supply to the furnace for each ton of metal about fifteen pounds of chlorid of lime (chlorin) for the purpose of cleansing the fused body. Preferably, with the chlorid of lime may be mixed, separately or together, anhydrous aluminum oxid and anhydrous borax, each in the proportion of two pounds, more or less, per ton of metal charged in the furnace or converter. The effect of the use of anhydrous aluminum oxid or of anhydrous borax, with the chlorid of lime is to cleanse more thoroughly the metal from oxidation or other injurious characteristics, and to lessen or suppress the generation of prejudicial gases in the furnace whereby the product, when poured from the furnace, shall possess great solidity, or in other words, run in a solid or homogeneous body of molten metal. The anhydrous aluminum oxid and the anhydrous borax may be inclosed together in one container, or either in a container separate from the other. The latter is my preferred mode, for greater convenience in handling.

It is known that chlorid of lime (chlorin) is a cleanser and purifier for many purposes; also that anhydrous aluminum oxid is a cleanser or remover of oxidation and rust from both steel and iron; and I find that their employment is advantageous in the use to which they are put in the furnace in carrying out the initial step or one part of my invention. The anhydrous borax also has similar properties.

The chlorid of lime, the anhydrous aluminum oxid and the anhydrous borax when mixed are packed by preference in a readily fusible envelop consisting of a pasteboard container placed in a box of extra-dry wood free from rosins or other substances from which gases might be generated. This box may be lined with heavy paper, and the measure of the furnace door should be taken so that said box may be of such proportions as to permit it to be readily inserted. The ingredients, however, if preferred, may be formed or compressed into briquets. The box or briquets when thrown into the furnace will readily liberate its contents into the body of molten metal. Before the introduction of these containers or envelops, it may be preferable to raise the temperature of the furnace somewhat above that necessary for tapping, the effect of the introduction being to bring the metal to the proper temperature for that purpose.

The desired treatment having been effected within the furnace, I now pour the molten metal, elementally changed by the initial process described, into a ladle, and while therein add thereto the required proportion of lead, preferably about five pounds, more or less, to one ton of metal in the furnace.

The successful results attending the use of the furnace treatment upon the larger body of metal, while the ladle treatment is effected upon a smaller body thereof, appear to arise from the introduction of lead preferably in ingots to the ladle when about a quarter full before it is poured into the mold, thus obtaining the ductility and malleability due to the presence of lead at the most advantageous time. It is found that but little if any slag remains in the bottom of the ladle after the pouring into the ingot mold or the casting patterns.

The furnace treatment, by which the cleansing of the metal from matter injurious thereto is effected, increases the output of solid product, and it is found to have attained qualities which fit it when poured into the ladle to receive that further treatment which imparts to it tenacity, elasticity and ductility.

It has been demonstrated that under my treatment the cavities, recesses or piping at the head of an ingot average but three and one half inches. Practically a solid ingot is produced of uniform cross sectional area, the piping being eliminated or reduced to the minimum. I do not wish to commit myself to any theory in explanation of this fact.

The effect of the combined steps or procedures herein described is the production of an improved metal possessing the qualities mentioned. In other words, a solid mass of clean, homogeneous steel is obtained. The proportions of ingredients used may be varied in view of the diversified classes of iron, as pig, scrap, steel and iron castings, etc., constituting the charge, my process allowing the use of any kind of metal ordinarily employed in the conversion of iron into steel.

In addition to the cleansing and purifying of the metal in the furnace by the use of the combined chemicals set forth, there appears to be a further chemical action which creates a heat in excess of that obtained in the ordinary methods of melting and liquefying the metal charged in the furnace; and one of the chief features of my invention is this chemical production of additional heat due to the employment of the ingredients used in the process, it being an important commercial asset.

Furthermore, due to the chemicals used in my process it has been found that there is a separation of the lighter elements or slag from the heavier part of metal, resulting in the overflow of the slag from the ladle. In other words, the chemicals used produce what may be termed an effervescence which in effect is a throwing off of the lighter parts from the heavier or solid parts. Hence, under my process, a lesser proportion of slag remains at the bottom of the ladle than is found in the practice of other methods known to me. Under my invention ingots are produced having no piping whatsoever at the head, but only a slight recession of one half to one inch over the entire top of the ingot.

Having thus described my invention, I claim:—

1. In a process of treating metal in a heated furnace or converter for the production of steel, the bringing into contact with the metal of chlorid of lime, anhydrous aluminum oxid and anhydrous borax, substantially in the proportions stated.

2. In a process of treating metal in a heated furnace or converter for the production of steel, the adding to the metal of chlorid of lime, anhydrous aluminum oxid and anhydrous borax, as a combined body, substantially in the proportions given.

3. In a process of treating metal in a furnace or converter for the production of steel, and when heated to about a semi-cherry red, the adding to the metal of chlorid of lime, anhydrous aluminum oxid and anhydrous borax, substantially in the proportions stated.

4. In a process of treating metal in a furnace or converter for the production of steel, and when heated to about a semi-cherry red, the adding to the metal of chlorid of lime, anhydrous aluminum oxid and anhydrous borax, as a combined body, substantially in the proportions stated.

5. The process of treating metal for the production of steel, which consists in adding to the metal, when in a heated furnace or converter, chlorid of lime, and thereupon adding to the molten metal, when poured into a ladle, lead, substantially in the proportions stated.

6. The process of treating metal for the production of steel, which consists in adding to the metal, when in a heated furnace or converter, chlorid of lime and anhydrous aluminum oxid, substantially in the proportions given, and thereafter adding to the molten metal, when poured into a ladle, lead, substantially in the proportions stated.

7. The process of treating metal for the production of steel, which consists in adding to the metal when in a heated furnace or converter, chlorid of lime and anhydrous borax, substantially in the proportions given, and thereafter adding to the molten metal, when poured into a ladle, lead, substantially in the proportion stated.

8. The process of treating metal for the production of steel, which consists in adding to the metal, when in a heated furnace or converter, chlorid of lime, anhydrous aluminum oxid, and anhydrous borax, substantially in the proportions given, and thereafter adding to the molten metal, when poured into a ladle, lead, substantially in the proportion stated.

9. The process of treating metal for the production of steel, which consists in adding to the metal when in a heated furnace or converter, chlorid of lime, anhydrous aluminum oxid, and anhydrous borax, substantially in the proportions given, and as a compound, and thereafter adding to the molten metal, when poured into a ladle, lead, substantially in the proportion stated.

10. The process of treating metal for the production of steel, which consists in adding to the metal, when in a furnace or converter, and heated to about a semi-cherry red, chlorid of lime, anhydrous aluminum oxid, and anhydrous borax, substantially in the proportions given, and thereafter adding to the molten metal, when poured into a ladle, lead, substantially in the proportion stated.

11. In a process of treating metal in a furnace or converter for the production of steel, the heating of the metal to about a semi-cherry red, and thereafter increasing the temperature thereof by bringing into contact therewith chlorid of lime, anhydrous aluminum oxid, and anhydrous borax, substantially in the proportions stated.

12. In a process of treating metal in a furnace or converter for the production of steel, the heating of the metal to about a semi-cherry red, and thereafter increasing the temperature thereof by bringing into contact therewith chlorid of lime, anhydrous aluminum oxid, and anhydrous borax, as a combined body, substantially in the proportions stated.

13. In the production of steel, the process of cleansing and purifying metal while in the converter, tapping from the converter a portion of said metal to a ladle or other receptacle, and adding lead, substantially in the proportion stated, to the body of metal so tapped, whereby to increase in the final or cast products the qualities of ductility, malleability and tenacity.

14. In the production of steel for the immediate molding of ingots or castings, the process of cleansing and purifying metal while in the converter, pouring the metal from the converter into a ladle, and adding to said metal after pouring, a substance whereby to increase the ductility, malleability and tenacity of the metal when solidified.

15. In the production of steel to be molded into ingots or other castings, the method of first cleansing and purifying the metal while in a furnace or converter, and afterward adding a substance to increase the qualities of ductility, malleability and tenacity in the body of metal tapped from the converter.

16. In the production of steel, the method of first cleansing and purifying the metal while in a furnace or converter, and afterward adding a substance to increase the qualities of ductility, malleability and tenacity to a body of metal tapped therefrom substantially in the proportion stated.

17. A steel product containing lead approximately in the proportion of five pounds per ton.

In testimony whereof I affix my signature in presence of two witnesses.

ALBERT H. HENDERSON.

Witnesses:
JAMES F. JOHNSON,
REGINA V. KAVANAUGH.